(12) United States Patent
Wang et al.

(10) Patent No.: US 11,928,113 B2
(45) Date of Patent: Mar. 12, 2024

(54) STRUCTURE AND METHOD OF AGGREGATION INDEX FOR IMPROVING AGGREGATION QUERY EFFICIENCY

(71) Applicant: ZHEJIANG BANGSUN TECHNOLOGY CO., LTD., Zhejiang (CN)

(72) Inventors: Xingen Wang, Hangzhou (CN); Xinyu Wang, Hangzhou (CN); Lu Jin, Hangzhou (CN); Wei Chen, Hangzhou (CN); Yang Gao, Hangzhou (CN); Ping Lu, Hangzhou (CN); Tao Huang, Hangzhou (CN)

(73) Assignee: ZHEJIANG BANGSUN TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 17/866,541

(22) Filed: Jul. 17, 2022

(65) Prior Publication Data

US 2022/0350807 A1    Nov. 3, 2022

Related U.S. Application Data

(63) Continuation of application No. PCT/CN2020/116654, filed on Sep. 22, 2020.

(30) Foreign Application Priority Data

May 21, 2020  (CN) .......................... 202010436039.3

(51) Int. Cl.
  *G06F 16/00*   (2019.01)
  *G06F 16/22*   (2019.01)
  (Continued)

(52) U.S. Cl.
  CPC .... *G06F 16/24556* (2019.01); *G06F 16/2228* (2019.01); *G06F 16/283* (2019.01)

(58) Field of Classification Search
  CPC ........... G06F 16/24556; G06F 16/2228; G06F 16/283
  (Continued)

(56) References Cited

U.S. PATENT DOCUMENTS 5,852,821 A * 12/1998 Chen ................. G06F 16/24556
2004/0002954 A1 * 1/2004 Chaudhuri ............. G06F 16/22
(Continued)

FOREIGN PATENT DOCUMENTS

CN    104376119 A     2/2015
CN    105205062 A    12/2015
(Continued)

OTHER PUBLICATIONS

International Search Report (PCT/CN2020/116654); dated Feb. 22, 2021.

*Primary Examiner* — Vincent F Boccio
(74) *Attorney, Agent, or Firm* — W&G Law Group (57) ABSTRACT

Provided is an aggregation index structure and an aggregation index method for improving aggregation query efficiency. The aggregation index partitions streaming data through two dimensions of grouping and slicing, and then aggregates the partitioned data. The structure includes index metadata, a sliced data list and a detailed data store; the aggregation index method includes three parts: aggregation index definition, aggregation index creation and aggregation index query. The aggregation index structure and method provided by the present disclosure can greatly improve the efficiency of aggregation query, support the ad hoc aggregation query of PB-level data, complete the aggregation query of a large amount of data in seconds, support the
(Continued)

insertion of new data at any time, and return the query results in minutes or even seconds latency in the event of changes of the query range conditions.

5 Claims, 4 Drawing Sheets

(51) Int. Cl.
*G06F 16/2455* (2019.01)
*G06F 16/28* (2019.01)

(58) Field of Classification Search
USPC .......................................................... 707/715
See application file for complete search history.

(56) References Cited

U.S. PATENT DOCUMENTS

| 2011/0093486 | A1  | 4/2011 | Lin et al. |
| 2023/0128085 | A1* | 4/2023 | Yan .................... G06F 12/0802 |
| | | | 707/737 |

FOREIGN PATENT DOCUMENTS

| CN | 106021458 | A | 10/2016 |
| CN | 106570113 | A | 4/2017 |
| CN | 109299102 | A | 2/2019 |

* cited by examiner

Query Example 1:

select sum(CVPoints)
    Aggregation  Aggregation
    Function      Field
groupby Channel = 'Android'
        Grouping Field  Grouping Value
where CVPoints >= 10 and CVPoints < 30
            Slice Field/Slice Range Query Example 2:

select sum(AmtDue)
    Aggregation  Aggregation
    Function      Field
groupby Origin = 'Offline'
       Grouping Field  Grouping Value
where UserLevel in ('L3', 'L5')
       Slice Field    Discrete Slice Range

FIG. 4

STRUCTURE AND METHOD OF AGGREGATION INDEX FOR IMPROVING AGGREGATION QUERY EFFICIENCY

CROSS-REFERENCE TO RELATED APPLICATIONS

The present application is a continuation of International Application No. PCT/CN2020/116654, filed on Sep. 22, 2020, which claims priority to Chinese Application No. 202010436039.3, filed on May 21, 2020, the contents of both of which are incorporated herein by reference in their entireties.

TECHNICAL FIELD

The present disclosure relates to the field of big data analysis, and improves the efficiency of exploratory ad hoc query of big data through a structure and a method of an aggregation for improving the efficiency of aggregation query.

BACKGROUND

Exploratory ad hoc query of big data is an important branch in the field of big data analysis. It helps users to mine data characteristics, understand business conditions and summarize business rules through interactive and flexible query of large amounts of data in seconds and minutes, and thus it has important application value in the fields of finance, e-commerce, logistics, telecommunications, transportation, public security, military industry and so on. Big data exploratory ad hoc query has the following characteristics:

(1) Big data aggregation query: big data exploratory ad hoc query is mostly used for business analysis, so a batch of data will be filtered through complex conditions in hundreds of billions of records and PB-level data, and the result set will be aggregated and calculated, so as to find the business trend or rule, for example, counting the number of users who access through mobile phones from 0:00 to 2:00 in the morning.

(2) Low-latency data update: the insertion of new data is supported, and the latest data can be can quickly queried. Because the business personnel need to adjust the system functions and parameters in time according to the query results, the timeliness requirements of data are getting higher and higher, and it is necessary to support the insertion and quick analysis of new data at any time.

(3) The query conditions change within a certain range: the objects of an exploratory query will not change, but the query range will change. For example, in order to group users, e-commerce merchants will count the variance and standard deviation of the order amount of users at different ages, such as the variance of the order amount of users aged 30-35 and the variance of order amount of users aged 30-40. The objects of these queries are user and order data, and the business personnel can obtain smaller variance by constantly adjusting the age range, so as to achieve more accurate user grouping.

(4) Second-level or minute-level result return: since the business personnel need to wait for the query result directly when conducting an exploration query, a waiting time for result return must be acceptable to the business personnel, usually no more than 5 minutes; in a data mining scenario, the business personnel need to construct features from hundreds of fields according to the query results. Too long waiting time seriously affects work efficiency, and leads to the inability to extract and build features correctly.

Based on the above characteristics, the current technical scheme cannot fully meet the requirements of an exploratory ad hoc query of big data in terms of query data quantity, data update, query condition change, result return time and so on.

Traditional relational database RDBMS is mostly used in OLTP scenarios, which can improve its transaction performance under the constraint of ACID. The aggregation query ability of the traditional relational database is very poor. In the ad hoc query scenario of big data with over 100 million data and tens of thousands of return result sets, the result return is usually at the hour level, and the memory may even overflow and thus the results cannot be returned.

Search engines such as ElasticSearch have high performance of insertion and query, which can support original data at the PB level, inverted index and various filtered aggregation queries. However, like the traditional DBMS, since it is optimized to index and query of detailed data, it encounters serious performance bottlenecks when querying aggregation of big data, and cannot return the results quickly.

Big data processing systems, such as Spark and HBase, can store and query large-scale data through the MapReduce mechanism, can process PB-level data, and can perform aggregation queries almost without any limitation. However, due to the lack of effective indexing mechanism, the query efficiency is extremely low, which cannot meet the requirements of the ad hoc query for latency. In addition, big data processing systems such as Spark mainly involve offline batch processing, so it is inconvenient to import new data, and it is impossible to process the latest data quickly.

Kylin and Druid are OLAP tools with pre-defined logic and pre-calculated results, which support the insertion of new data and can quickly query according to the logic booked in advance, and can meet the requirements to a certain extent. However, they do not store details, so they cannot meet the change requirements of query conditions in exploratory scenarios.

SUMMARY

The purpose of the present disclosure is to provide an aggregation index structure and aggregation index method for improving aggregation query efficiency, to solve the problem of exploratory ad hoc aggregation query of big data, which are suitable for the technical field of general database and big data analysis, and support OLTP and OLAP application scenarios including finance, e-commerce, logistics, telecommunications, transportation, public security, military industry, etc.

The present disclosure is realized by the following technical solution: structure of an aggregation index for improving aggregation query efficiency, wherein the aggregation index partitions streaming data by two dimensions of grouping and slicing, and then aggregates the partitioned data, and its structure includes index metadata, a sliced data list and a detailed data store.

The index metadata records definition information of the aggregation index, including a grouping field GroupBy, a slice field SliceBy, a slice starting point Start, a slice ending point Stop, a slice step length Step, an aggregation field and an aggregation function Aggregation.

The sliced data list consists of intermediate-state data of all slices belonging to a same group; the intermediate-state data of each slice contains a current slice range and an aggregation result; in addition, the intermediate-state data of each slice also contains the storage location of the detailed data corresponding to the slice, so as to implement more accurate query and addition of new data later.

The detailed data store stores the streaming detailed data in units of slices; a memory, a local file system or a distributed file system such as HDFS can be selected as a storage medium of streaming detailed data according to the different data volumes; the streaming detailed data store stores a value of the aggregation field or all fields of streaming details. The streaming detailed data store stores the value of the aggregation field or all fields of streaming details. The streaming detailed data store stores the value of the aggregation field, which can save space and improve efficiency, and supports other query operations of the aggregation field. The streaming detailed data store stores all fields of streaming details, and can query and analyze other fields except the aggregation fields, so as to exchange storage space for query flexibility.

Furthermore, in the partitioning of the streaming data into two dimensions of grouping and slicing, the streaming data is first partitioned into different groups according to the grouping field, then the streaming data of each group is partitioned into limited segments according to the slice field, and finally the value corresponding to the aggregation field in the streaming data is aggregated by the aggregation function.

Furthermore, the aggregation function includes summation, maximum, minimum, count and other functions.

Furthermore, if the range of slice field is discrete distribution, there is no need to set the slice starting point, the slice ending point or the slice step length.

Furthermore, the streaming detailed data store stores the value of the aggregation field or all fields of streaming details. The streaming detailed data store stores the value of the aggregation field, which can save space and improve efficiency, and supports other query operations of the aggregation field. The streaming detailed data store stores all fields of streaming details, and can query and analyze other fields except the aggregation fields, so as to exchange storage space for query flexibility.

A method of an aggregation index for improving aggregation query efficiency includes the following steps:

(1) Definition of the aggregation index: defining the aggregation index to declare establishment rules of the index, including a grouping field, a slice field and method, an aggregation field and an aggregation function.

(1.1) Grouping streaming data by the grouping field, and further slicing and segmenting the streaming data with a same corresponding value in the grouping field and then aggregating.

(1.2) Partitioning the grouped streaming data with finer granularity by the slice field and method, wherein the grouped streaming data will be further segmented according to the value of the slice field and the slice method defined by a user; the slice method includes three parameters: a slice starting point, a slice ending point and a slice step length; by setting the above three parameters, the streaming data of a same group can be partitioned into a limited number of segments; if the range of slice field is discrete distribution, there is no need to set the slice starting point, the slice ending point or the slice step length.

(1.3) Performing aggregation calculation on the streaming data belonging to a same slice through the aggregation field and aggregation function; specifically, aggregating the data in the aggregation field according to the specified aggregation function, and recording an aggregation result in a form of intermediate-state data.

(2) Creation of the aggregation index: after the definition of the aggregation index is completed, establishing corresponding index metadata according to the definition, wherein the index metadata comprise a grouping field, a slice field, a slice starting point, a slice ending point, a slice step length, an aggregation field and an aggregation function; constructing the aggregation index by using original streaming data; wherein the original streaming data is added into the aggregation index in sequence according to the following steps:

(2.1) Determining the corresponding sliced data list according to a value of the grouping field of the original streaming data.

(2.2) According to a value of the slice field of the original streaming data, determining slice intermediate-state data in the sliced data list.

(2.3) Updating the slice intermediate-state data according to a value of the aggregation field of the streaming data.

(2.4) According to the sliced data, positioning a storage location of the corresponding detailed data and storing the streaming data.

(3) Aggregation index query: using the intermediate-state data of the aggregation slice in the aggregation index, and quickly returning an aggregation query result; wherein the specific steps are as follows:

(3.1) Confirming that the current query conforms to the established index data, and the query fails if the following conditions exist:

a. The index data is not grouped according to the grouping field of a query statement.

b. The index data is not sliced according to the slice field of the query statement.

(3.2) Determining whether the current query hits the index data; wherein if the aggregation field and the aggregation function of the current query are consistent with those in the index data, then step (3.3) is executed; if there is any inconsistency between the aggregation function and the aggregation method, it is necessary to find all the detailed data of the slice involved in the current query, and calculate the required aggregation result according to the aggregation field and the aggregation function in the query.

(3.3) Determining whether the slice range of the current query is consistent with the slice intermediate-state data in the index data; wherein if the slice range of the current query can be directly combined with the slice range of one or more slice intermediate-state data in the index data, the query result can be aggregated by the aggregation result of the slice intermediate-state data; if the slice range of the current query cannot be directly combined with the slice range of the slice intermediate-state data in the index data, it is necessary to traverse and aggregate the detailed data of adjacent slices to form a query result.

Furthermore, a process of inserting new data into the aggregation index is consistent with the process of adding the streaming data in sequence in the process of creating the aggregation index.

The aggregation index structure and method provided by the present disclosure can greatly improve the efficiency of aggregation query, support the ad hoc aggregation query of PB-level data, complete the aggregation query of a large number of data in seconds, support the insertion of new data at any time, return query results in minutes or even seconds latency when the query range conditions change, and support the functional and performance requirements of all aspects of the exploratory ad hoc query of big data.

DESCRIPTION OF EMBODIMENTS

Hereinafter, the specific embodiments of the present disclosure will be described in further detail with reference to the accompanying drawings.

Figure 1:
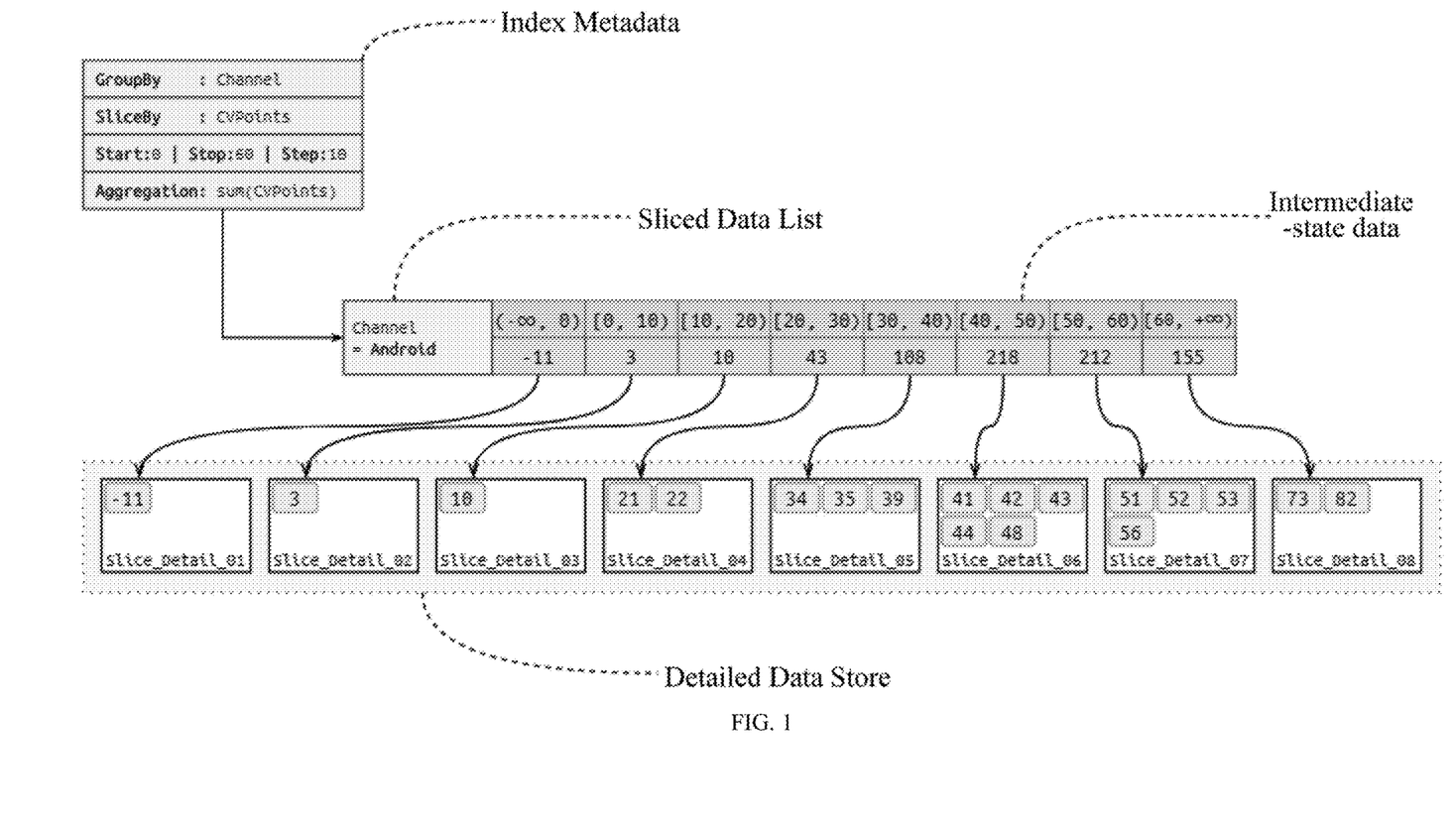
FIG. 1 is a diagram of an aggregation index structure.

FIG. 1 show the aggregation index structure and aggregation index method for improving aggregation query efficiency provided by the present disclosure. In the aggregation index method of the present disclosure, massive streaming data is processed, corresponding aggregation index data is established, and the aggregation query speed of streaming data is accelerated. The aggregation index deals with structured streaming data, that is, each piece of streaming data includes multiple fields, and each field has a corresponding name and field value. The aggregation index structure for improving aggregation query efficiency incudes index metadata, a sliced data list and a detailed data store.

The aggregation index partitions the streaming data by grouping and slicing. The streaming data is first partitioned into different groups according to a grouping field, and then the streaming data of each group is partitioned into limited segments according to slice field. Finally, the value corresponding to the aggregation field in the streaming data is aggregated by the aggregation function. Its structure includes index metadata, a sliced data list and a detailed data store.

The index metadata records definition information of the aggregation index, including a grouping field GroupBy, a slice field SliceBy, a slice starting point Start, a slice ending point Stop, a slice step length Step, an aggregation field and an aggregation function. The value range of the grouping field is a finite set of discrete distribution. The aggregation field represents the field of an actual data store.

The sliced data list consists of intermediate-state data of all slices belonging to the same group. The intermediate-state data of each slice contains the range of a current slice and an aggregation result. In addition, the intermediate-state data of each slice also saves the storage location of the corresponding fine data contained in the slice, so as to implement more accurate query and addition of new data later. Taking the aggregation index in FIG. 1 as an example, slice [20, 30) contains two items of data, i.e., 21 and 22. Therefore, in the intermediate-state data, the slice range is [20, 30), and the value of the aggregation result is 21+22=43. At the same time, the slice also saves the storage location Slice_Detail_04 of its corresponding detailed data, which is convenient for adding new data and traversing data.

Figure 2:
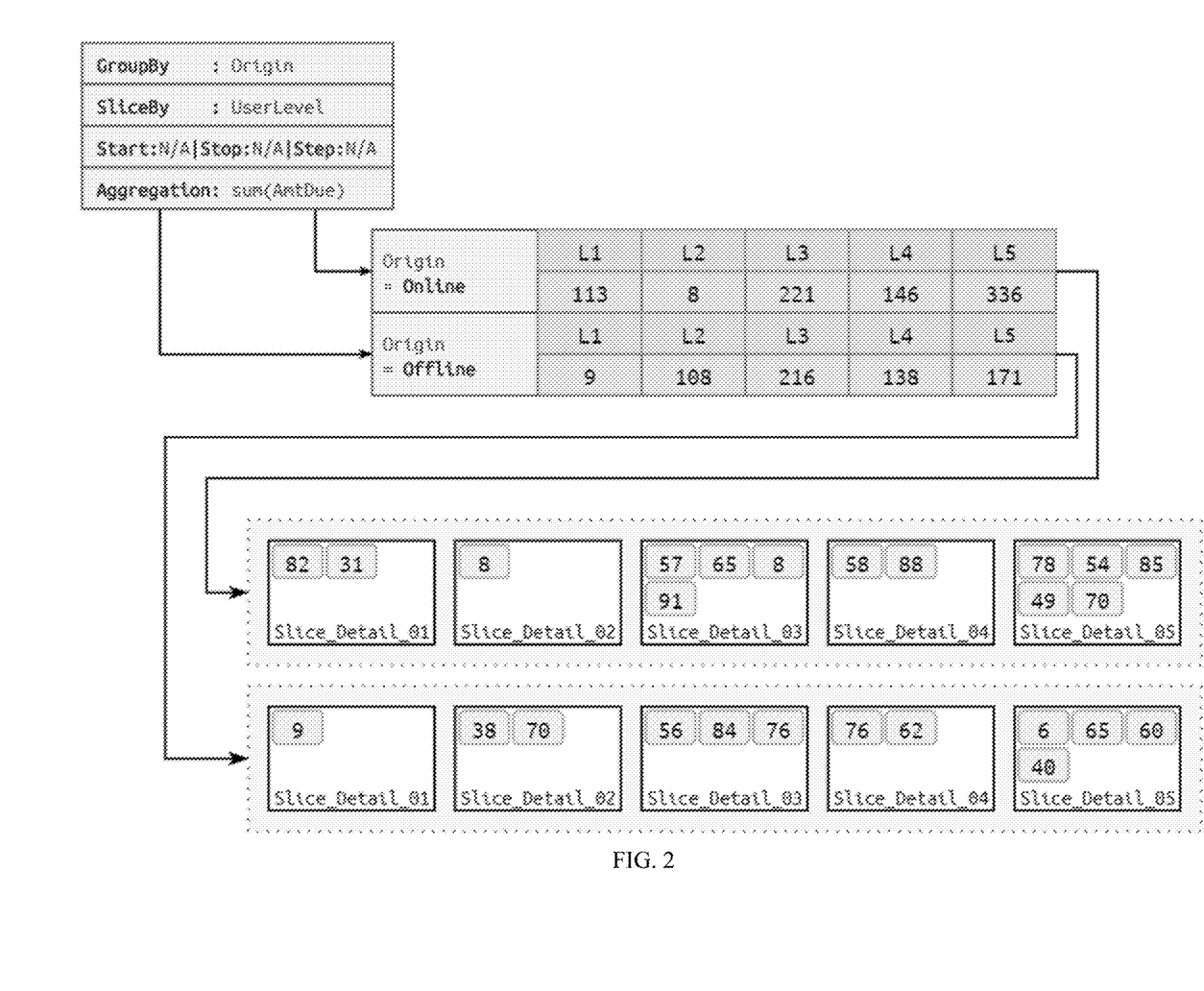
FIG. 2 is an exemplary diagram of an aggregation index.

The detailed data store stores the streaming detailed data in units of slices; the memory, local file system or distributed file system such as HDFS can be selected as the storage medium of the streaming detailed data according to different data volumes. The streaming detailed data store stores the value of the aggregation field or all fields of streaming details. The streaming detailed data store stores the value of the aggregation field, which can save space and improve efficiency, and supports other query operations of the aggregation field. The streaming detailed data store stores all fields of streaming details, and can query and analyze other fields except the aggregation fields, so as to exchange storage space for query flexibility. In actual operation, different storage schemes can be selected according to business requirements. For example, the aggregation index shown in FIG. 2 requires data analysis of the total order amount of users from different sources and different levels, with the source Origin as the grouping field and the User-Level as the slice field. If only the order amount AmtDue is stored in the streaming details, only query related to the order amount can be queried later. If other fields, such as order time, are stored in the details, you can make more flexible queries. For example, the total amount of orders placed in the morning by L4 users, whose Origin equals to "Online".

The present disclosure provides an aggregation index method for improving aggregation query efficiency based on an aggregation index structure, which comprises the following steps:

(1) Definition of aggregation index; it is used to declare the establishment rules of the index, including a grouping field, slice field and method, aggregation field and aggregation function.

(1.1) The streaming data is grouped by grouping fields, and the streaming data with the same corresponding value in the grouping field will be further sliced and segmented and then aggregated. The grouping field selects the corresponding grouping field in the streaming data for the actual needs of users themselves. For example, if the Channel field in the streaming data identifies the user's terminal type: iOS/Android/Web, and if Channel is designated as the grouping field, the streaming data will be partitioned into three groups: iOS/Android/Web.

(1.2) The grouped streaming data is partitioned with finer granularity by the slice field and method; the slice method includes three parameters: a slice starting point, a slice ending point and a slice step length. By setting the above three parameters, the streaming data of the same group is partitioned into limited segments; for example, taking the user integral CVPoints as the slice field, and setting the slice starting point as 0, the slice ending point as 60, and the slice step length as 10, users are partitioned into eight slices: (−∞, 0), [0, 10), [10, 20), [20, 30), [30, 40), [40, 50), [50, 60), (60, +∞); if the value range of the slice field is distributed discretely, there is no need to set the slice starting point, slice ending point or slice step length. For example, if the UserLevel is used as the slice field and its value range is L1/L2/L3/L4/L5, the slice can be performed directly according to the value range without setting three parameters of the slice method.

(1.3) Aggregation calculation is performed on the streaming data belonging to the same slice through the aggregation field and the aggregation function; specifically, data in the aggregation field is aggregated according to specified aggregation function, wherein the aggregation function include summation, maximum, minimum, counting, etc., and records an aggregation result in the form of intermediate-state data.

(2) Creation of aggregation index: after the definition of the aggregation index is completed, corresponding index metadata is established according to the defined content, wherein the index metadata includes a grouping field, a slice field, a slice starting point, a slice ending point, a slice step length, an aggregation field and an aggregation function; an aggregation index is established by using original streaming data, wherein the original streaming data is read in batches from a memory, a local file system or a distributed file system such as HDFS, or imported from other systems by pushing or querying; the original streaming data is added into the aggregation index in sequence according to the following steps:

(2.1) Determining the corresponding sliced data list according to a value of the grouping field of the original streaming data.

(2.2) According to a value of the slice field of the original streaming data, determining slice intermediate-state data in the sliced data list.

(2.3) Updating the slice intermediate-state data according to a value of the aggregation field of the streaming data.

(2.4) According to the sliced data, positioning a storage location of the corresponding detailed data and storing the streaming data.

Figure 3:
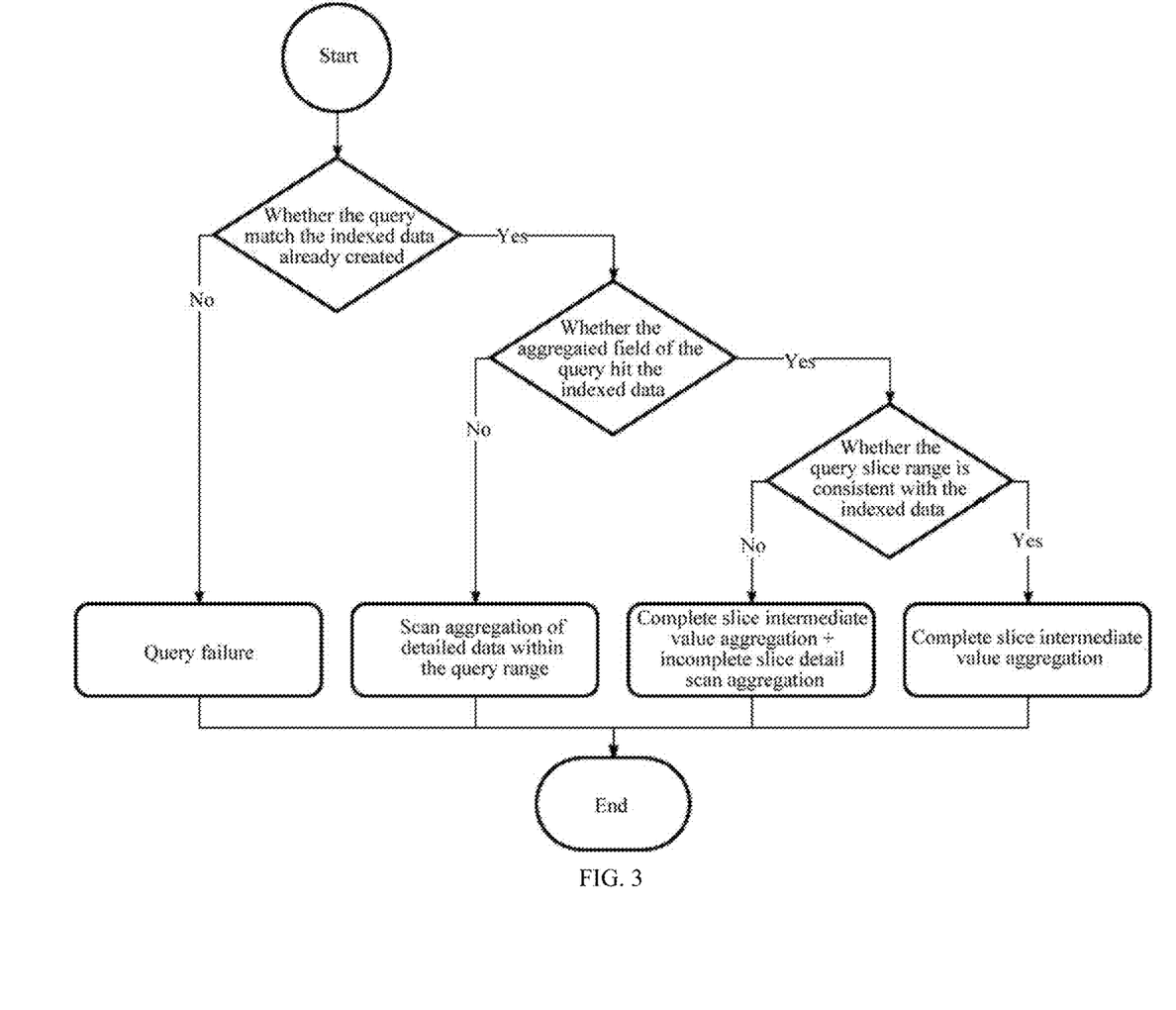
FIG. 3 is a flow chart of aggregation index retrieval.
Figure 4:
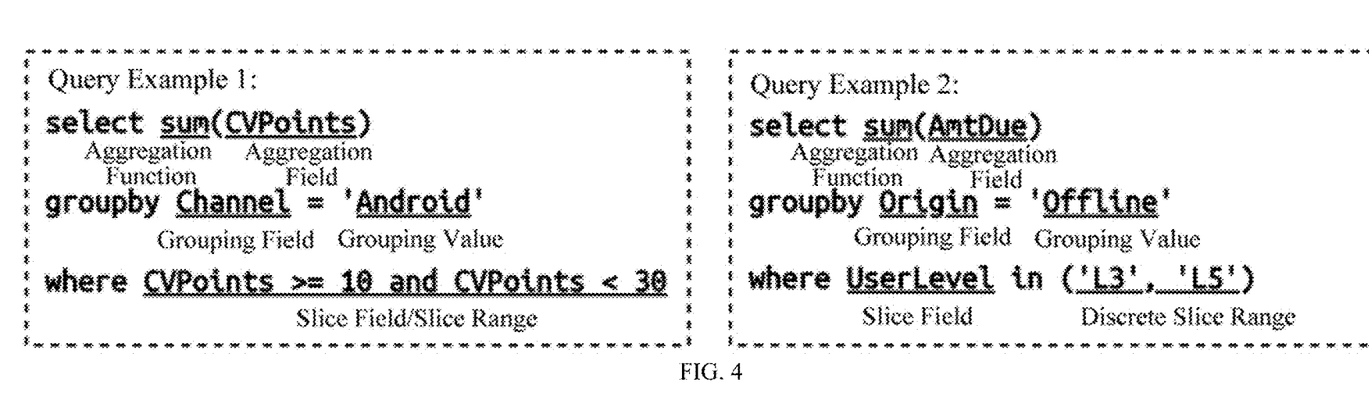
FIG. 4 is a schematic diagram of an example sentence of an aggregation index query.

The process of inserting new data to update the aggregated index is consistent with the process of adding streaming data in sequence in the index creation process. After searching the index, searching the slice, updating the intermediate-state data and storing the details, the aggregated index data can be updated;

(3) Aggregation index query: as shown in FIG. 3, the aggregation query result can be quickly returned by using the intermediate-state data aggregation of the slice in the aggregation index. Taking two query statements in FIG. 4 as examples, the definition of query conditions and the specific query process of the aggregation index are explained.

a. Query example 1: for Android users, sum CVPoints between 10 and 30.

b. Query example 2: for Offline users, sum the order amount AmtDue of the users with UserLevel L3 and L5.

Definition of the query conditions includes the following parts:

Grouping field query value: the grouping field and the corresponding query value of the query are specified. In Example 1, it is defined by group by clause, the grouping field is Channel, and the query value is iOS.

Slice field and range: the slice field of the query and the corresponding field value range are specified. In Example 1, the where clause defines the continuous slice fields and ranges, and the data with CVPoints within [10, 30) is queried. The where clause of Example 2 defines discrete slice fields and ranges, and only the data with UserLevel L3 and L5 is queried.

Aggregation field and aggregation function: the aggregation function and field to be aggregated are specified. In Example 1, through the definition of a select clause, the sum aggregation operation is performed on the values in the aggregation field CVPoints.

The specific steps of the aggregation index query are as follows:

(3.1) Confirm that the current query conforms to the established index data, and the query fails if the following conditions exist:

A. the index data is not grouped according to the grouping field of the query statement.

B. The index data is not sliced according to the slice field of the query statement.

(3.2) Whether the current query hits the index data is judged; If the aggregation field and the aggregation function of the current query are consistent with those in the index data, then step (3.3) is executed; if there is any inconsistency between the aggregation function and the aggregation method, it is necessary to find all the detailed data of the slices involved in the current query, and calculate the required aggregation results according to the aggregation field and the aggregation function in the query.

(3.3) Whether the currently queried slice range is consistent with the slice intermediate-state data in the index data is judged; if the slice range of the current query can be directly combined with the slice range of one or more slice intermediate-state data in the index data, the query result can be aggregated by the aggregation result of the slice intermediate-state data through the corresponding aggregation function. For example, Example 1 queries the sum of the streaming data CVPoints between [10, 30). If the aggregation index data is shown in FIG. 1, the values of [10, 20) and [20, 30) slices can be added and directly returned to 10+43=53. This kind of query makes full use of the intermediate results of the aggregation index, so it can return the query results in seconds or even milliseconds. If the slice range of the current query cannot be directly combined with the slice range of the slice intermediate-state data in the index data, it is necessary to traverse and aggregate the detailed data of adjacent slices to form the query result. For example, if the CVPoints range in the where clause in query example 1 is changed to [2, 30), the query cannot be completed directly by combining slices if the aggregated index data is shown in FIG. 1. Therefore, it is necessary to traverse all the detailed data of the slice [0, 10), get the qualified aggregation result 3, and add it with the values in slices [10, 20) and [20, 30), and finally return 3+10+43=56. Although this kind of query cannot directly use the intermediate results of the aggregation index, it greatly reduces the scanning calculation of detailed data, so it can return the query results in minutes.

It should be noted that when the data compression apparatus provided in the foregoing embodiment performs data compression, division into the foregoing functional modules is used only as an example for description. In an actual application, the foregoing functions can be allocated to and implemented by different functional modules based on a requirement, that is, an inner structure of the apparatus is divided into different functional modules, to implement all or some of the functions described above. For details about a specific implementation process, refer to the method embodiment. Details are not described herein again.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a server or a terminal, all or some of the procedures or functions according to the embodiments of this application are generated. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive).

The above embodiments are used to explain the present disclosure, but not intended to limit the present disclosure. Any modifications and changes made to the present disclosure within the spirit of the present disclosure and the protection scope of the claims shall fall into the protection scope of the present disclosure.

What is claimed is:

1. A data index apparatus for improving aggregation query efficiency, the apparatus comprising a memory and at least one processor, data to be analyzed being arranged in a structure of an aggregation index, wherein the aggregation index partitions streaming data by two dimensions of grouping and slicing, and then aggregates partitioned data, of which the structure comprises index metadata, a sliced data list and a detailed data store, wherein data arrangement, partition and aggregation are performed by the at least one processor according to instructions stored in the memory;

the index metadata contain definition information of the aggregation index, comprising a grouping field GroupBy, a slice field SliceBy, a slice starting point Start, a slice ending point Stop, a slice step length Step, an aggregation field and an aggregation function Aggregation;

the sliced data list consists of intermediate-state data of all slices belonging to a same group; the intermediate-state data of each slice contains a current slice range and an aggregation result; in addition, the intermediate-state data of each slice further contains a storage location of the detailed data corresponding to the slice, so as to implement more accurate query and operations of adding new data later;

the detailed data store stores the streaming detailed data in units of slices; the memory, a local file system or a distributed file system including Hadoop Distributed File System HDFS is selected as a storage medium of streaming detailed data according to different data volumes; the streaming detailed data store stores a value of the aggregation field or all fields of streaming details.

2. The data index apparatus for improving aggregation query efficiency according to claim 1, wherein in the partitioning of the streaming data into two dimensions of grouping and slicing, the streaming data is first partitioned into different groups according to the grouping field, then the streaming data of each group is partitioned into limited segments according to the slice field, and finally the value corresponding to the aggregation field in the streaming data is aggregated by the aggregation function.

3. The data index apparatus for improving aggregation query efficiency according to claim 2, wherein the aggregation function comprises summation, maximum, minimum, count and other functions.

4. A method of an aggregation index for improving aggregation query efficiency, comprising the following steps:

(1) definition of the aggregation index; defining the aggregation index to declare establishment rules of the index, comprising a grouping field, a slice field and method, an aggregation field and an aggregation function;

(1.1) grouping streaming data by the grouping field, and further slicing and segmenting the streaming data with a same corresponding value in the grouping field and then aggregating;

(1.2) partitioning, by the slice field and method, the grouped streaming data with finer granularity, wherein the grouped streaming data will be further segmented according to a value of the slice field and the slice method defined by a user; the slice method has three parameters: a slice starting point, a slice ending point and a slice step length; by setting the above three parameters, streaming data of a same group can be partitioned into a limited number of segments; if a range of slice field is discrete distribution, there is no need to set the slice starting point, the slice ending point or the slice step length;

(1.3) performing aggregation calculation on streaming data belonging to a same slice through the aggregation field and the aggregation function; specifically, aggregating the data in the aggregation field according to the specified aggregation function, and recording an aggregation result in a form of intermediate-state data;

(2) creation of the aggregation index: after the definition of the aggregation index is completed, establishing corresponding index metadata according to the definition wherein the index metadata comprise a grouping field, a slice field, a slice starting point, a slice ending point, a slice step length, an aggregation field and an aggregation function; constructing the aggregation index by using original streaming data, wherein the original streaming data is added into the aggregation index in sequence to the following steps:

(2.1) determining the corresponding sliced data list according to a value of the grouping field of the original streaming data;

(2.2) determining slice intermediate-state data in the sliced data list according to a value of the slice field of the original streaming data;

(2.3) updating the slice intermediate-state data according to a value of the aggregation field of the streaming data;

(2.4) positioning a storage location of the corresponding detailed data according to the sliced data and storing the streaming data;

(3) aggregation index query: using the intermediate-state data aggregation of the slice in the aggregation index, and quickly returning an aggregation query result; wherein the specific steps are as follows:

(3.1) confirming that the current query conforms to the established index data, and the query fails if the following conditions exist:
a. the index data is not grouped according to the grouping field of a query statement;
b. the index data is not sliced according to the slice field of the query statement;

(3.2) determining whether the current query hits the index data; wherein if the aggregation field and the aggregation function of the current query are consistent with the aggregation field and the aggregation function in the index data, then step (3.3) is executed; if there is any inconsistency between the aggregation function and the aggregation method, it is necessary to find all the detailed data of the slice involved in the current query, and calculate the required aggregation result according to the aggregation field and aggregation function in the query;

(3.3) determining whether the slice range of the current query is consistent with the slice intermediate-state data in the index data; wherein if the slice range of the current query can be directly combined with the slice range of one or more slice intermediate-state data in the index data, the query result can be aggregated by the aggregation result of the slice intermediate-state data; if the slice range of the current query cannot be directly combined with the slice range of the slice intermediate-state data in the index data, it is necessary to traverse and aggregate the detailed data of adjacent slices to form a query result.

5. The method of an aggregation index for improving aggregation query efficiency according to claim 4, wherein a process of inserting new data into the aggregation index is consistent with the process of adding streaming data in sequence in the process of creating the aggregation index.

* * * * *